United States Patent [19]

Raszewski et al.

[11] Patent Number: 4,987,997
[45] Date of Patent: Jan. 29, 1991

[54] PACKAGING BAG

[75] Inventors: Lewis R. Raszewski, Stevensville, Md.; Jerome J. Kipnees, Cranbury, N.J.

[73] Assignee: The Crowell Corporation, Newport, Del.

[21] Appl. No.: 200,671

[22] Filed: May 31, 1988

Related U.S. Application Data

[63] Continuation-in-part of Ser. No. 80,623, Jul. 31, 1987, abandoned, and a continuation-in-part of Ser. No. 54,024, May 22, 1987, and a continuation-in-part of Ser. No. 931,215, Nov. 14, 1986, abandoned, said Ser. No. 54,024, is a continuation-in-part of Ser. No. 938,600, Dec. 5, 1986, abandoned.

[51] Int. Cl.⁵ ............................................. B65D 27/18
[52] U.S. Cl. ................................. 206/328; 428/922; 428/212; 428/34.1
[58] Field of Search .................. 206/328; 428/35, 922, 428/418, 212, 412

[56] References Cited

U.S. PATENT DOCUMENTS

| 4,610,353 | 9/1986 | Young | 206/328 |
| 4,648,508 | 3/1987 | Neal et al. | 206/328 |
| 4,699,830 | 10/1987 | White | 206/328 |
| 4,706,438 | 11/1987 | Ohlbach | 206/328 |

Primary Examiner—Joseph Man-Fu Moy
Attorney, Agent, or Firm—Connolly and Hutz

[57] ABSTRACT

A bag for holding and protecting articles sensitive to mechanical damage as well as to electric fields, the walls of the bag being essentially a layer of cushiony microfoam about 1 to about 4 millimeters thick, an essentially unfoamed polyethylene coating about 25 to about 100 microns thick on the inside surface of the microfoam, an essentially unfoamed support layer on the opposite surface of the microfoam, at least one face of the support layer being treated to protect the bag contents against external electric fields, and the polyethylene coating carrying sufficient antistat to protect the bag contents against the build-up of static electricity to the intensity that damages those contents when they are slid into the bag.

13 Claims, 2 Drawing Sheets

PACKAGING BAG

This application is in part a continuation of applications:

| Ser. No. | Filing Date |
| --- | --- |
| 80,623 | July 31, 1987 (subsequently abandoned) |
| 54,024 | May 22, 1987 |
| 931,215 | November 14, 1986, (subsequently abandoned) | and Ser. No. 54,024 is in turn a continuation-in-part of prior application Ser. No. 938,600, filed Dec. 5, 1986 and subsequently abandoned.

The present invention relates to packaging bags, particularly bags that are simple to use and protect their contents against mechanical damage as well as against static electricity or other adverse influences.

Among the objects of the present invention are improved packaging bags of the above types.

Figure 1:
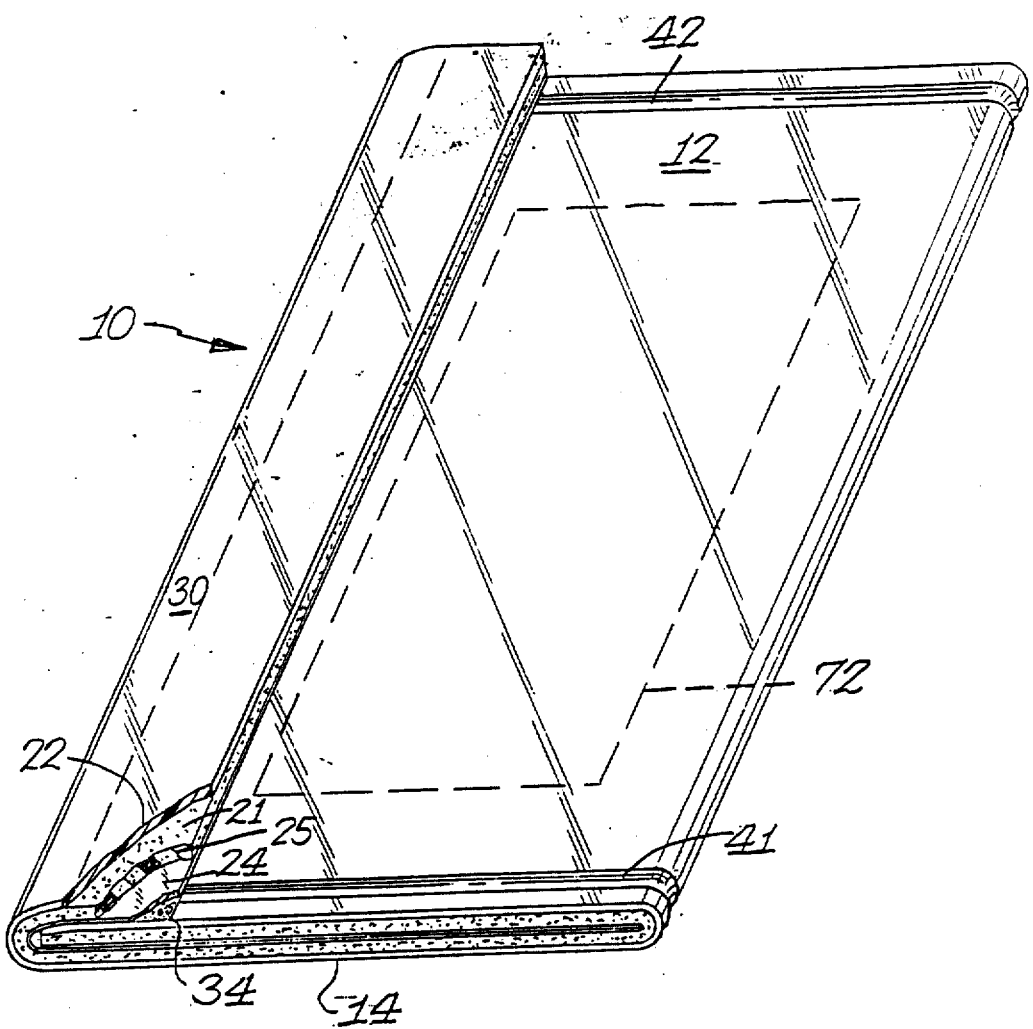
Figure 2:
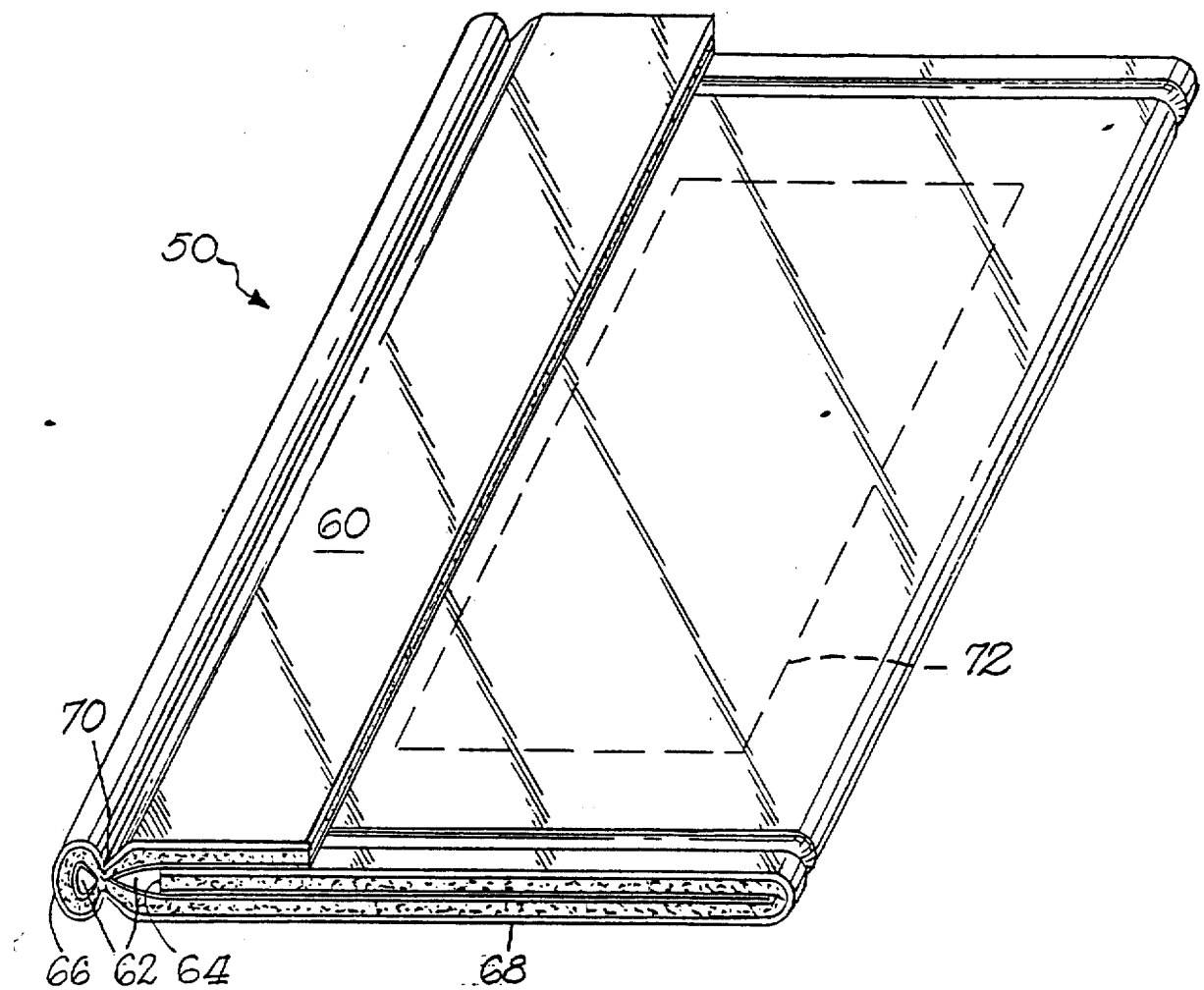

The foregoing as well as additional objects of the present invention will be more fully understood from the following description of several of its exemplifications, reference being made to the accompanying drawings in which:

FIG. 1 is an isometric view of one form of packaging bag according to the present invention; and FIG. 2 is a similar view of a different form of such packaging bag.

According to one aspect of the present invention, a bag for holding and protecting articles sensitive to mechanical damage as well as to electrical fields, has walls that are essentially a layer of cushiony microfoam about 1 to about 4 millimeters thick, an essentially unfoamed polyethylene coating about 25 to about 100 microns thick on the inside surface of the microfoam, an essentially unfoamed support layer on the opposite surface of the microfoam, at least one face of the support layer being treated as by metallizing to protect the bag contents against external electric fields, and the polyethylene coating carrying sufficient antistat to protect the bag contents against the build-up of static electricity to the intensity that damages those contents when they are slid into the bag.

Such a bag combines a number of very desirable features. Thus it is very readily produced by heat sealing from laminates and the like that are conveniently manufactured in continuous lengths easily cut to the desired shapes.

Turning now to FIG. 1 by way of example, this shows a bag 10 having walls 12, 14 of three-ply construction. The center ply 23 is a layer of cushiony foam about 1 to about 4 millimeters thick, the outer face 21 of which is laminated to a support sheet 22 that is an essentially unfoamed strong covering such as a polyethylene terephthalate film that need not be thicker than about 25 microns. The inner face 25 of the foam sheet 23 is laminated to a thin layer of essentially unfoamed polyethylene 24.

Outer film 22 has at least one of its faces metallized to provide a Faraday Cage effect that protects anything in the bag from external electrical fields such as strong static electricity. To this end the metallization is preferably with a vacuum-deposited aluminum coating that provides a reflectivity of at least about 60%, or has an electrical resistance of less than 100 ohms per square. Such a metallized coating is preferably on the inner face of film 22. Where it is on the outer face, such coating is preferably covered with an acrylic lacquer or other hard top coating. Both faces of the film 22 can be metallized, in which event each metallized coating can be a little thinner than as described above.

It is also helpful to have both bag side panels 12, 14 as folded over portions of the same laminate sheet so that there is very good electrical continuity between the metallized coatings on the respective panels.

The essentially unfoamed polyethylene film 24 is preferably about 25 to about 100 microns thick and provides an internal bag surface of low friction so that articles can be easily slid into the bag, and also easily removed. That film also carries an anti-stat such as a quaternary as described in U.S. Pat. No. 4,321,297, that can be coated over it as there described or one that can be incorporated in the polyethylene as described in U.S. Pat. No. 4,623,594. This prevents the build-up of dangerous static electricity when something like a circuit board is slid into or out of the bag.

Bag 10 can also have a flap 30 that extends from wall 14 and can fold over wall 12. A coating of cement 34 such as pressure-sensitive cement on the face of the flap or the corresponding location on wall 12 enables the sealing of the bag after it is filled. A removable cover strip, not shown, that is weakly held by the cement 34 and can be readily pulled off, can be used to keep the adhesive covered until the flap is to be sealed in place. Cohesive-nonadhesive coatings can alternatively be used to hold the flap in its sealed position, in which case such coatings should be on both of the surfaces to be sealed together.

The walls 12, 14 are readily heat sealed together at 41, 42 at or near their edges. Heated shoes or wheels can be used to apply the heat sealing heat, and the presence of the polyethylene layers 24 makes the heat sealing simpler and more effective, particularly when the foam layer 23 is polypropylene or other material more difficult to heat seal. Thus many polyurethanes are not directly heat sealable, but a low density polyethylene face layer 24 on the polyurethane, whether the polyurethane is foamed or unfoamed, makes such a combination readily heat-sealable through the polyethylene even when the polyethylene layer is only about 25 microns thick. Such a layer can also be used with polyurethanes that are heat-sealable, inasmuch as the unaided heat sealing of polyurethanes requires temperatures substantially higher than desired.

A single film of low-density polyethylene can be inserted between two separate non-heatsealable or difficulty heat-sealable members to render them readily heat-sealable, but such insert should be at least about 40 microns thick.

The three separate layers of walls 12, 14, need not be made of separate materials. Thus the foam layer 23 can be manufactured as in U.S. Pat. Nos. 4,305,991, 4,352,854, 4,390,640, 4,444,704 or 4,701,473 so that the foaming action is not effective at its faces, or loses some or all of its foam bubbles at those faces, leaving the foam layer so manufactured with one or both faces in the form of essentially unfoamed skins about 25 to about 100 microns deep. Thus a thermoplastic foam sheet can have one surface flamed to melt that surface and form an essentially unfoamed skin. A polyethylene article so foamed can then be used as the three-layer laminate of FIG. 1, so that the metallizing of one of the skins completes the assembly.

Alternatively the foam layer can be manufactured with an essentially unfoamed skin on only one surface, and the opposite surface then laminated to a support film such as 22 that is previously or subsequently metallized.

As further alternatives the foam layer can be formed in situ as from a polyurethane foaming mixture held between face layers 22 and 24, so that the foam is formed and in its formation adherently bonds itself to both face layers. On the other hand the foam layer can be pre-formed and the face layers subsequently laminated to it, as by flaming the foam face and applying a face layer to it.

Polyethylene face layers are also easily extruded hot onto the foam so that they become permanently bonded to the foam as they cool. Polyethylene terephthalate layers are also extrudible in the same way. The foam can be of open-celled or closed-celled construction, preferably with micro-cells.

Instead of having the layer 22 a homogeneous layer of low density or high density polyethylene, or even of polyethylene terephthalate, it can be made of a sandwich of adherently united cross-tensilized polyethylene strata, or made of biaxially or uniaxially drawn polyethylene or polypropylene.

Flap 30 can be omitted and the bag left unsealed, or the flapless bag sealed by stapling or heat sealing together some or all of the wall edges at the bag mouth. Lengths of snap-together plastic strips can alternatively be adhered to the wall lips at each side of the bag mouth to close and open that mouth.

The polyethylene layer 24 can also be coated with volatile corrosion inhibitor to inhibit the corrosion of any metal inserted in the bag. Formulations for this purpose are given in prior application Ser. No. 82,794 filed Aug. 6, 1987 (U.S. Pat. No. 4,590,523), and the entire contents of that application are hereby incorporated herein as though fully set forth.

Where the foam layer is laminated to its support layer by a bonding agent, a pressure-sensitive adhesive such as disclosed in application Ser. No. 768,103 filed Aug. 21, 1985, and subsequently refiled, provides excellent bonding. A particularly desirable pressure-sensitive adhesive is a mixture of partially dealkylated polyacrylic cement with a styrene-butadiene block polymer in about a 50—50 proportion. These mixtures can be applied and used at relatively low temperatures.

Such pressure-sensitive laminants also improve the heat-sealing of the bag walls, as compared to laminants such as amorphous polypropylene that are not pressure-sensitive. Although pressure-sensitive laminants permit the foam to be peeled away from its support layer, the normal uses of the foregoing packaging bags is not compromised by such peelability.

The metallizing can be replaced by conducting fibers that provide effective electrical shielding as described in application Ser. No. 142,075 filed Jan. 11, 1988. Thus a laminant used to adhere the foam layer 23 to its backing 24, can have generally uniformly distributed through it about ½% to about 1% by weight of metal or metal-coated fibers about 3 millimeters long or longer and only about 20 microns thick or thinner. Such a laminant layer about 20 microns thick or thicker provides adequate electric shielding.

FIG. 2 illustrates a modified packaging bag 50 similar to bag 10 in that both have the three-layer walls described above. However bag 50 has a flap 60 that yieldably holds itself in place in bag-closing position without the use of adhesive.

Instead, flap 60 is long enough to provide a space 62 between the bag mouth 64 and the bight 66 where the flap returns to the bag panel 68. In this space 62 which extends the width of the bag, the flap is heat-sealed as at 70 to panel 68. This heat seal holds the flap in bag-closing position, but the yieldability of the flap and of panel 68 permits the lifting of the flap far enough for the insertion of items such as a circuit board 72 into the bag. It also permits the removal of such items. However when not disturbed the flap resists such lifting, so that anything in the bag will not slip or fall out even though the bag is shaken violently and held with its mouth facing downwardly.

Heat-seal 70 can extend continuously or interruptedly the width of the bag, and can be very narrow as illustrated, or broader. It can for example extend to bight 66. It can also be replaced by an adhesive seal or even by a line of staples.

A sandwich of cross-tensilized polyethylene films mentioned above is described in Ser. No. 931,215 and the references of record there, and makes an exceedingly puncture-resistant backing regardless of whether it is metallized and even when the sandwich is as thin as 40 microns.

The sandwiches are readily adhered to the foam with pressure-sensitive cement as described above, even when the foam is a polyethylene foam. It may be desirable to corona treat the foam or the sandwich or both, if other adhesives are used. Such sandwich-foam laminates are particularly desirable cushioning devices even without the unfoamed surface skin 24. They need not be in bag form, but can for example be used in sheet form to wrap around sharp-edged metal objects to cushion them and also to keep sharp edges from cutting through the foam backing.

For such wrapping, the laminate's exposed foam face, or the exposed face of the backing, can be coated with a cohesive-nonadhesive layer that simplifies the securing of the wrapper around any object to be protected, as described in U.S. Pat. Nos. 4,321,297 and 4,086,384.

A foam layer can also be formed in situ on the surface of a cross-tensilized polyethylene sandwich as by applying a spreadable and curable layer of foam-forming mixture in the manner described for example in parent Ser. No. 82,794 as well as in U.S. Pat. No. 4,423,103. The curing of such a mixture into a cushiony foam causes that foam to adhere to the face of the sandwich whether or not that face has been corona-treated.

A layer of foam about 1 millimeter to about 5 millimeters thick secured in this manner to a sandwich from about 50 to about 100 microns thick makes a very effective cushioning laminate. Polyurethane foam-forming mixes can generally be readily provided without using expensive high-pressure extruders or the like, to form open-celled foam that is more cushiony than closed-cell foam.

For thermal insulation uses the foam thickness of the sandwich-foam laminate can be as thick as 25 to 50 millimeters, preferably no thinner than about 10 millimeters. Such laminates are suitable to wrap around the trunks of citrus trees to protect them against freezes, as described in Ser. No. 931,215 and in application Ser. No. 157,272 filed Feb. 17, 1988. Open-celled foams are more desirable than closed-celled foams for such laminates. The sandwich backing is best arranged to be the outer face of the wrap, to better protect the wrap. It is also preferred to incorporate ultra-violet absorbers in the sandwich to help prolong the life of the wrap, after it is on the tree, to at least two years.

Foam-forming mixtures can also be applied to paper and set to provide protective foam-paper laminates that are not required to have the tear or puncture resistance of the relatively expensive cross-tensilized polyethylene. Papers as light-weight as 30-pound Kraft are adequate, but heavier papers including 90-pound liner board can also be used. Single-face corrugated board is also a very suitable foam support for protecting heavy objects as described in Ser. No. 80,623, with the foam applied to either the closed or the open face of the corrugated board. Even for such heavy support backings, the foam thickness need only be from about 1 to about 5 millimeters.

Polyethylene and polypropylene foams are quite inexpensive and are preferably foamed in place on paper or board or on the cross-tensilized polyethylene, even though expensive extruders or the like are used to supply such a foam-forming mix. Here again foam thicknesses of from about 1 to about 5 millimeters are preferred, whether the foam is closed-cell or open-cell.

The cross-tensilized polyethylene sandwich, particularly in a total thickness of about 40 to about 70 microns can be laminated to plain paper, such as 30-pound Kraft, to provide a paper-like laminate of unusually high strength and resistance to tearing as well as to puncturing. Any of the pressure-sensitive laminants can be used, and the laminate is highly suited for making into mailing envelopes. The automatic machinery used to make standard paper envelopes will convert such laminate to an envelope with very little adjustment. On the other hand the manufacture of Tyvek-type envelopes is quite awkward and expensive.

Both faces of a cross-tensilized sandwich can be laminated to paper to give a product which even more closely resembles paper and can be readily printed on and cemented to at either face.

The laminate with one paper facing is also particularly desirable for use as highly tear-resistant gummed wrapping tape, as described in Ser. No. 82,794. The gum for such tape can be of the water-moistening type which is best applied to the paper face. The resulting tape is superior to one made by laminating paper to biaxially oriented polyethylene or polypropylene film, inasmuch as the biaxially oriented film tears easily at even the slightest nick. The cross-tensilized sandwich remains highly tear-resistant even when nicked or partly cut.

According to the present invention, packaging bags can be made with see-through walls so that the identity of any object contained in such a bag is readily visible. To this end the bag wall is made of highly reticulated foam. Such a foam is open-celled with many of its internal walls blown away, as described in U.S. Pat. Nos. 4,670,477 or 4,656,196. This leaves a great many unobstructed viewing apertures, even when the foam is as much as 4 mils thick. The foam itself can be of any resin such as polyurethanes, and the resin need not be transparent. Indeed the resin can be loaded with acetylene black or other electrically conductive material. The loading should not be over about 20%, in order to retain the cushioning of the foam. Such loading can make it unnecessary to provide anti-stat coatings on either face of the foam.

Facing layers such as 22 and 24 can be applied to the reticulated foam, but should be quite transparent in order to not seriously detract from its see-through nature. Where the loaded foam is not as anti-static as desired, either or both of the facing layers can be adhered to the foam with an adhesive contining the above-described metal fibers, or they can be slightly metallized but a reflectivity of 15% should not be exceeded. Metallizing can alternatively or additionally be applied to the foam surface, and here the metallizing can be as heavy as needed.

As noted above, cohesive-nonadhesive coatings can be applied to panel surfaces so that they can be secured to other surfaces. Such securing can for example take the place of any or all of the heat sealings or of the sealing needed to make envelopes from the paper-resin laminates. Even porous members such as open-cell or reticulated foams can have cohesive-nonadhesive coatings applied, but care should be taken with such items that are to be subsequently wound up into a roll, that the cohesive-nonadhesive does not penetrate through the pores to the back of such item. This is best controlled by having the cohesive-nonadhesive mixture highly viscous when it is applied, a viscosity of at least 3000 centipoises at room temperature being preferred. By conducting the application with the mixture relatively cold, e.g. below 50° C., the desired viscosity is easier to attain. Thickening agents such as alkali metal polyacrylates can thus be added to the natural latex formulations generally used to make formulations and only about a 1 to 2 percent addition is generally adequate.

It is also desirable for the applied cohesive-nonadhesive mixture to be highly concentrated, as for example about 50% to about 60% solids. This not only adds to the viscosity but shortens the time for the mixture to set after it is applied.

Even porous fabrics such as diaper fabric and the like can have such cohesive-nonadhesive application so that individual diapers can be cut out and then secured around a body, without materially detracting from the porosity of the fabric, whether woven or non-woven.

It should be understood that various changes and modifications to the preferred embodiments described herein will be apparent to those skilled in the art, without departing from the spirit and scope of the present invention.

We claim:

1. A bag for cushioning and protecting articles sensitive to mechanical damage as well as to electric fields, the walls of the bag being essentially a layer of cushiony microfoam about 1 to about 4 millimeters thick, an essentially unfoamed polyethylene coating about 25 to about 100 microns thick on the inside surface of the microfoam, an essentially unfoamed support layer on the opposite surface of the microfoam, at least one face of the support layer being treated to protect the bag contents against external electric fields, and the polyethylene coating carrying sufficient antistat to protect the bag contents against the build-up of static electricity to the intensity that damages those contents when they are slid into the bag.

2. A plastic bag having front and back panels secured to each other so that one edge of each defines a mouth for the bag, one of the panels having an extension in the form of a flap that folds over the other panel to cover the mouth, the extension being adhered to said one panel in such a way as to yieldably hold the flap in the fold-over position while permitting the flap to be unfolded when necessary.

3. A heat-sealable sheet of cushiony microfoam about 1 to about 4 millimeters thick, an essentially unfoamed polyethylene surface on one face of the sheet, and a strong support layer on the opposite face of the sheet, the polyethylene surface carrying sufficient antistat to prevent build-up of damaging antistatic electricity when articles are slid along that surface, and the support layer being treated to form an electrical shield.

4. The combination of claim 1 in which the polyethylene is low-density polyethylene.

5. The combination of claim 3 in which the polyethylene is low-density polyethylene.

6. The combination of claim 2 in which the adherence of the extension to its panel is by an essentially linear heat-seal adjacent to but spaced from the fold-over bight.

7. The combination of claim 6 in which the heat-seal is between surfaces of readily heat-sealable low molecular weight polyethylene.

8. The combination of claim 1 in which the bag is essentially transparent.

9. The combination of claim 8 in which the support layer treatment that protects the bag contents against external electric fields is a layer of essentially transparent binder in which is dispersed about ½% to about 1% by weight of metal or metalcoated fibers at least about 3 millimeters long and not over about 20 microns thick.

10. The combination of claim 8 in which the foam is so highly reticulated as to be essentially transparent.

11. The combination of claim 3 in which the sheet is essentially transparent.

12. The combination of claim 11 in which the support layer treatment that protects the bag contents against external electric fields is a layer of essentially transparent binder in which is dispersed about ½% to about 1% by weight of metal or metal-coated fibers at least about 3 millimeters long and not over about 20 microns thick.

13. The combination of claim 11 in which the foam is so highly reticulated as to be essentially transparent.

* * * * *